US011640003B2

(12) United States Patent
Di Grazia et al.

(10) Patent No.: US 11,640,003 B2
(45) Date of Patent: May 2, 2023

(54) METHOD FOR DETECTING SPOOFING IN A GLOBAL NAVIGATION SATELLITE SYSTEM RECEIVER, CORRESPONDING RECEIVER APPARATUS AND COMPUTER PROGRAM PRODUCT

(71) Applicant: STMicroelectronics S.r.l., Agrate Brianza (IT)

(72) Inventors: Domenico Di Grazia, Cesa (IT); Fabio Pisoni, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 15 days.

(21) Appl. No.: 17/313,434

(22) Filed: May 6, 2021

(65) Prior Publication Data
US 2021/0364644 A1  Nov. 25, 2021

(30) Foreign Application Priority Data
May 20, 2020  (IT) .................. 102020000011794

(51) Int. Cl.
*G01S 19/21* (2010.01)
*G01S 19/37* (2010.01)
*H04K 3/00* (2006.01)

(52) U.S. Cl.
CPC .......... *G01S 19/215* (2013.01); *G01S 19/37* (2013.01); *H04K 3/25* (2013.01); *H04K 3/90* (2013.01)

(58) Field of Classification Search
CPC ......... G01S 19/215; G01S 19/30; H04K 3/90; H04K 3/25
See application file for complete search history.

(56) References Cited

U.S. PATENT DOCUMENTS 6,658,048 B1 * 12/2003 Valio ................. G01S 19/30
  375/150
6,987,820 B1 *  1/2006 Brenner ............. G01S 19/22
  375/343

(Continued)

OTHER PUBLICATIONS

Pini, et al. (2013). Detection of Correlation Distortions Through Application of Statistical Methods. 26th International Technical Meeting of the Satellite Division. pp. 3279-3289. (Year: 2013).*

(Continued)

*Primary Examiner* — Gregory C. Issing
(74) *Attorney, Agent, or Firm* — Slater Matsil, LLP

(57) ABSTRACT

An embodiment method comprises receiving a satellite signal in a tracking channel, generating a set of replicas of a pseudo random noise sequence, comprising a punctual replica and a plurality of replicas that are different in time with respect to the punctual replica over a given time spacing, correlating the received signal with each replica to obtain amplitude correlation values, monitoring the tracking channel to detect a spoofed signal by generating a further plurality of replicas of the pseudo random noise sequence having a respective time spacing greater than the given time spacing, correlating the received signal of the tracking channel with each further replica to obtain further amplitude correlation values, calculating a shape anomaly factor based on the further correlation amplitude values, verifying the shape anomaly factor is greater than a given shape anomaly threshold, and signaling detection of a spoofed signal on the tracking channel.

20 Claims, 10 Drawing Sheets

(56) References Cited

U.S. PATENT DOCUMENTS

| | | | | |
|---|---|---|---|---|
| 7,205,935 | B2* | 4/2007 | Sleewaegen | H04B 1/7085 375/E1.032 |
| 9,166,649 | B2* | 10/2015 | Revol | H04B 1/71 |
| 2006/0215739 | A1* | 9/2006 | Williamson | H04B 1/7085 375/150 |
| 2016/0294438 | A1 | 10/2016 | Raasakka et al. | |
| 2019/0041528 | A1* | 2/2019 | Schüttpelz | H04L 27/2278 |

OTHER PUBLICATIONS

Schmidt et al ("GPS spoofing detection and classification correlator-based technique using the LASSO").arxiv.org, Cornell University Library, 201 Olin Library Cornell University Ithaca, NY 14853, Apr. 29, 2020 (Apr. 29, 2020). (Year: 2020).*

A. Cavaleri, et al, "Detection of spoofed GPS signals at code and carrier tracking level," 2010 5th ESA Workshop on Satellite Navigation Technologies and European Workshop on GNSS Signals and Signal Processing (NAVITEC), 2010, pp. 1-6. (Year: 2010).*

Van Es et al. GNSS Spoofing Revised Edition. NLR Netherlands Aerospace Centre. Jun. 2019. p. 1-74. (Year: 2019).*

Jafarnia-Jahromi et al. "GPS Vulnerability to Spoofing Threats and a Review of Antispoofing Techniques." Hindawi Publishing Corporation International Journal of Navigation and Observation vol. 2012, Article ID 127072, 16 pages. (Year: 2012).*

Broumandan et al. "Effect of Tracking Parameters on GNSS Receiver Vulneraility to Spoofing Attack." ION GNSS, 2016 Conference Session E5. Sep. 12-16, 2016. (Year: 2016).*

Montgomery, Paul Y., et al., "A Multi-Antenna Defense Receiver-Autonomous GPS Spoofing Detection", Inside GNSS, www.insidegnss.com, https://web.stanford.edu/group/scpnt/gpslab/website_files/anti-spoofing/insideGNSS_rasd-montgomery.pdf., Mar. / Apr. 2009, 7 pages.

Pini, Marco et al., "Detection of Correlation Distortions Through Application of Statistical Methods", Proceedings of the 26th International Technical Meeting of the ION Satellite Division, ION, GNSS+2013, Nashville, Tennessee, Sep. 16-20, 2013, 11 pages.

Schmidt, Erick et al., "A GPS spoofing detection and classification correlator-based technique using the LASSO", IEEE Transactions on Aerospace and Electronic Systems (Accepted with Major Changes), Aug. 23, 2019, 13 pages.

* cited by examiner

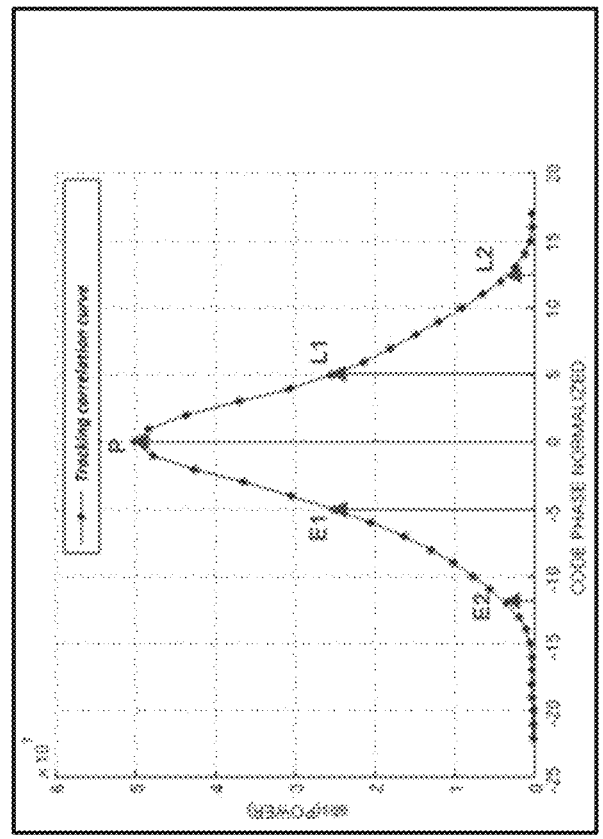
FIG. 4A
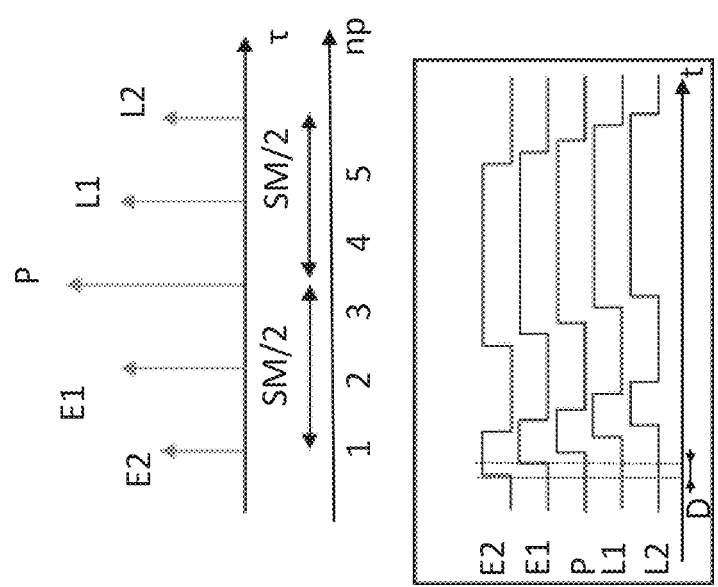
FIG. 4B
FIG. 3

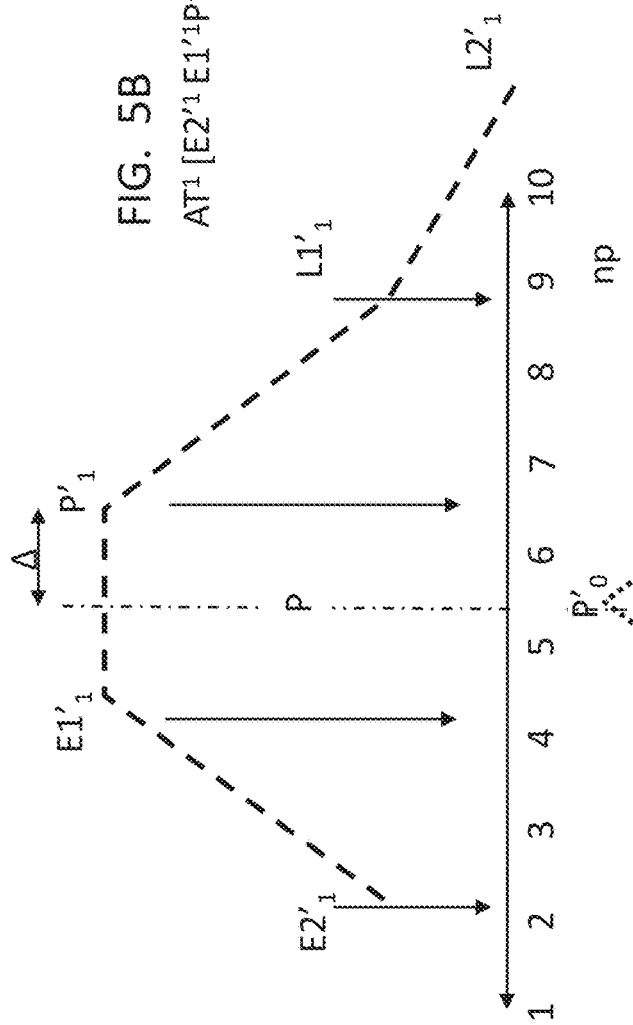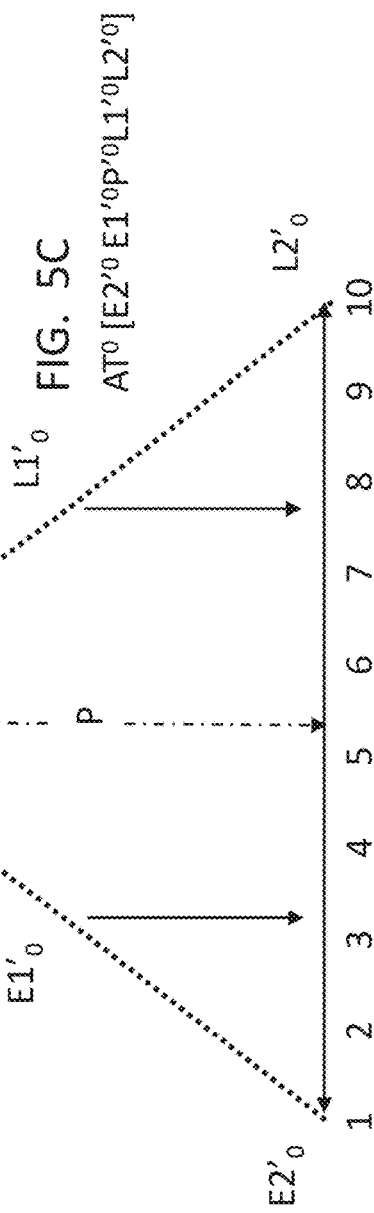

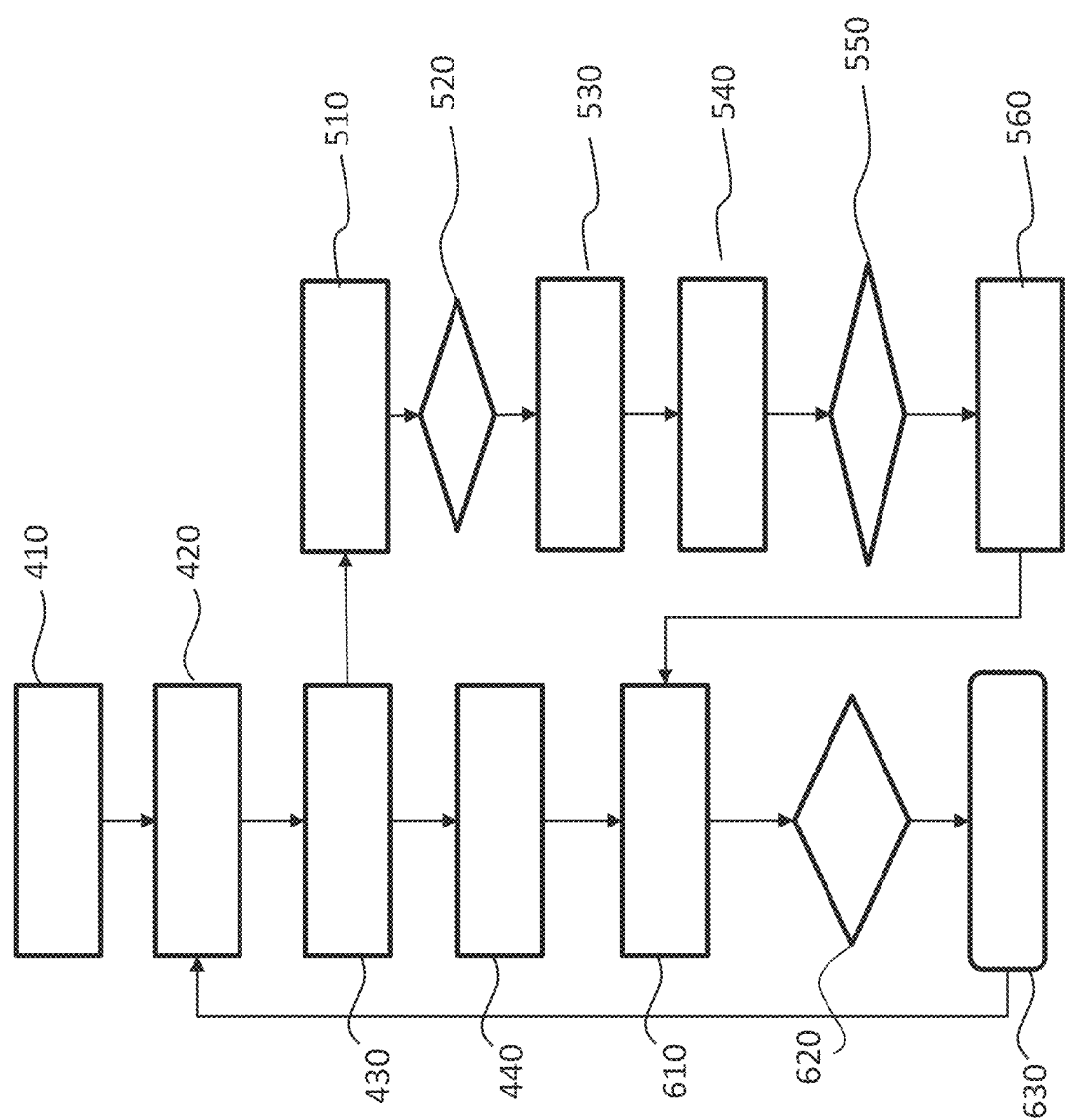

METHOD FOR DETECTING SPOOFING IN A GLOBAL NAVIGATION SATELLITE SYSTEM RECEIVER, CORRESPONDING RECEIVER APPARATUS AND COMPUTER PROGRAM PRODUCT

CROSS-REFERENCE TO RELATED APPLICATIONS

This application claims priority to Italian Patent Application No. 102020000011794, filed on May 20, 2020, which application is hereby incorporated herein by reference.

TECHNICAL FIELD

Embodiments of the present disclosure relate to detection of a spoofed signal in a GNSS (Global Navigation Satellite System) receiver, and related receiver apparatus and computer program product. The present disclosure in particular describes techniques for detecting a tracking channel affected by a spoofing signal in a GNSS Multi Frequency-Multi Constellation Receiver.

BACKGROUND

Integrity is a key feature in the transport field, and the increasing availability of low cost "Meaconing"/"Spoofing" systems is a critical issue.

A so called "spoofer" can intentionally lead a receiver to estimate a fake position and cause incorrect decisions.

Autonomous and assisted driving applications are raising the requirements for on-board GNSS receivers and to have a robust anti-spoofing system operating with such a receiver is a necessity.

To detect a spoofing signal and consequently a spoofed signal, i.e., a signal tracked into the tracking channel which is locked on the spoofing signal, into the receiver it is known to perform a method based on Parallel Least Mean Square calculation, which includes executing position identification using more constellations in an independent way and checking the consistency among them. It relies on the assumption that the Spoofing attack is not affecting all the tracked constellations/bandwidths.

This solution acts only after the spoofer has taken the tracking channels and needs multifrequency/parallel positioning to survive.

Also, other methods use Navigation Message Authentication, which is a Galileo Public Regulated Service (PRS), i.e., an encrypted navigation service for governmental authorized users. Signal Ephemerides are "encrypted" and a key management is required between satellite and PRS receiver.

This solution needs PRS Galileo tracking and usage, and is not suitable for a GPS only solution.

Also, a further method envisages detecting GPS spoofing with a multiple antenna array, as per https://web.stanford.edu/group/sepnt/gpslab/website_files/anti-spoofing/insideGNSS_rasd-montgomery.pdf.

Such a solution relies on the use of additional hardware.

SUMMARY

In view of the above, it is an objective of the present disclosure to provide solutions which overcome one or more of the above drawbacks.

According to one or more embodiments, one or more of the above objectives is achieved by means of a method having the features specifically set forth in the claims that follow. Embodiments moreover concern a related receiver apparatus and computer program product.

The claims are an integral part of the technical teaching of the disclosure provided herein.

As mentioned before, the present disclosure relates to a method for detecting spoofing in a GNSS receiver, comprising receiving at least a satellite signal, acquiring the satellite signal as received signal, performing a tracking of the received signal including receiving the received signal in at least one tracking channel comprising a bank of correlators receiving in-phase and quadrature versions of the received signal, generating a Pseudo Random Noise sequence at a code frequency set by a code Numerical Controlled Oscillator comprised in the tracking channel determining a code rate, performing a GNSS Pseudo Random Noise delayed sequence generation, including generating, on the basis of a Pseudo Random Noise sequence received from the GNSS Pseudo Random Noise sequence generator, a set of replicas of the Pseudo Random Noise sequence comprising a punctual replica and a plurality of replicas which are early in time or delayed in time with respect to the punctual replica of the Pseudo Random Noise sequence over a given time spacing, correlating the received signal with each replica in the set of replicas of the Pseudo Random Noise sequence to obtain amplitude correlation values, wherein the method includes monitoring at least a tracking channel to detect a spoofed signal by generating a further plurality of replicas of the Pseudo Random Noise sequence of the at least a tracking channel having a respective time spacing greater than the given time spacing, correlating the received signal at least a tracking channel with each replica in the further plurality of replicas of the Pseudo Random Noise sequence to obtain further amplitude correlation values, calculating a shape anomaly factor as a function of the further correlation amplitude values determined by the further plurality of replicas, verifying if the shape anomaly factor is greater than a given shape anomaly threshold, and, in the affirmative, signaling detection of a spoofed signal on the monitored tracking channel.

In variant embodiments, the monitoring the at least a tracking channel to detect a spoofed signal includes providing a set of tracking channels comprising a first subset of tracking channels operating with a set of replicas spaced of the given time spacing and a second subset of auxiliary channels which replicas are spaced of the second spacing greater than the given time spacing, the monitoring operation comprising allocating a corresponding monitoring channel comprising a one or more auxiliary tracking channels in the second subset of auxiliary channels, having respective replicas which are spaced of the second spacing greater than the given time spacing, the auxiliary tracking channels receiving the same received signal received by the monitored tracking channel and operating with the same Pseudo Random Noise sequence.

In variant embodiments, the monitoring the at least a tracking channel to detect a spoofed signal includes providing a set of tracking channels comprising a first subset of tracking channels operating with a set of replicas spaced of a first delay value and a second subset of auxiliary channels which replicas are spaced of a second delay value greater than the first delay value, the monitoring operation comprising allocating a corresponding monitoring channel comprising a plurality of auxiliary tracking channels in the second subset of auxiliary channels, having respective replicas which are delay shifted one with respect to the other of a third delay.

In variant embodiments, the monitoring includes measuring a parameter representative of the input noise on one or more of the tracking channels verifying if the parameter representative of the input noise is greater than given noise threshold in at least one of the tracking channels, and, if a determined tracking channel is above the noise threshold, performing the operation of allocating with respect to the determined tracking channel.

In variant embodiments, the parameter representative of the input noise is a weighted sum of discriminator parameters, in particular EML and DD discriminators.

In variant embodiments, calculating a shape anomaly factor as a function of the correlation amplitude values of the auxiliary tracking channels includes computing a sum of the differences between the points having nominally the same amplitude correlation values in each auxiliary channel, in particular with respect to the nominal tracked peak point.

In variant embodiments, signaling detection of a spoofed signal on the monitored tracking channel includes signaling a spoofing alert.

In variant embodiments, signaling detection of a spoofed signal on the monitored tracking channel includes gating the output of the monitored tracking channel.

In variant embodiments, signaling detection of a spoofed signal on the monitored tracking channel includes detecting the separation between the spoofed signal and the satellite signal and stopping the tracking channel above a given value of separation, then reacquiring the satellite signal.

In variant embodiments, after signaling detection of a spoofed signal the operation of detecting the separation between the spoofed signal and the satellite signal and stopping the tracking channel above a given value of separation, then reacquiring the satellite signal includes performing a runtime consistency check between the satellite predicted position, which is obtained by Ephemerides Extrapolation, and the Range Peak point measurement outputted by the monitored tracking channel, verifying if a spatial separation between the spoofed signal and the original satellite signal is greater than a given separation distance, and, in the affirmative, discarding the current tracked Peak point monitored tracking channel which is determined by the spoofed signal and reacquiring the satellite signal using the predicted position.

In variant embodiments, the verifying if the parameter representative of the input noise is above a given noise threshold in at least one of the tracking channels includes verifying if the measured parameter representative of the input noise is greater than corresponding parameters representative of the input noise measured on other tracking channels in the first subset of tracking channels.

The present disclosure relates also to a receiver apparatus configured to perform the method of any of the previous embodiments, comprising an arrangement for detecting a spoofed signal comprising a GNSS Pseudo Random Noise sequence generator for generating a further plurality of replicas of the Pseudo Random Noise sequence of the at least a tracking channel having a respective time spacing greater than the given time spacing, the arrangement being further configured to correlate the received signal at least a tracking channel with each replica in the further plurality of replicas of the Pseudo Random Noise sequence to obtain further amplitude correlation values calculate a shape anomaly factor as a function of the further correlation amplitude values determined by the further plurality of replicas, verify if the shape anomaly factor is greater than a given shape anomaly threshold, and, in the affirmative, signal detection of a spoofed signal on the monitored tracking channel.

In variant embodiments, the receiver comprises a set of tracking channels comprising a first subset of tracking channels operating with a set of replicas spaced of the given time spacing and a second subset of auxiliary channels which replicas are spaced of the second spacing greater than the given time spacing.

In variant embodiments, the receiver comprises a set of tracking channels comprising a first subset of tracking channels operating with a set of replicas spaced of a first delay value and a second sunset of auxiliary channels spaced of a second delay value greater than the first delay value.

In variant embodiments, the at least tracking channel includes the arrangement for detecting a spoofed signal, the GNSS Pseudo Random Noise sequence generator generating both the set of replicas of the Pseudo Random Noise sequence with a given spacing and the further plurality of replicas having a respective time spacing greater than the given time spacing.

The present disclosure relates also to a computer program product directly loadable into the internal memory of a digital computer, comprising software code portions for performing the steps of the method of any of the previous embodiments.

BRIEF DESCRIPTION OF THE DRAWINGS

Embodiments of the present disclosure will now be described with reference to the annexed drawings, which are provided purely by way of non-limiting example and in which:

FIGS. 3, 4A and 4B are time diagrams of signals formed in the GNSS receiver apparatus of FIG. 2;

FIGS. 5A, 5B and 5C, collectively FIG. 5, are a schematic time diagram of a monitoring channel and corresponding auxiliary tracking channels;

FIG. 7, are schematic time diagrams of an example of monitoring channel and corresponding auxiliary tracking channels;

FIG. 8, are schematic time diagrams representing auxiliary tracking channels in a spoofing scenario of operation;

FIG. 9, are schematic time diagrams of an anomaly shaping parameter in a normal scenario of operation and in spoofing scenario of operation;

FIG. 10 is a flow diagram of an embodiment of the method according to the solution here described.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

A navigation receiver operates by down converting to quasi baseband the input signal received from the satellites, which is transmitted at L band (1-2 GHz), using a local oscillator to step down the input frequency and allow a baseband digital management of the Satellite information.

Figure 1:
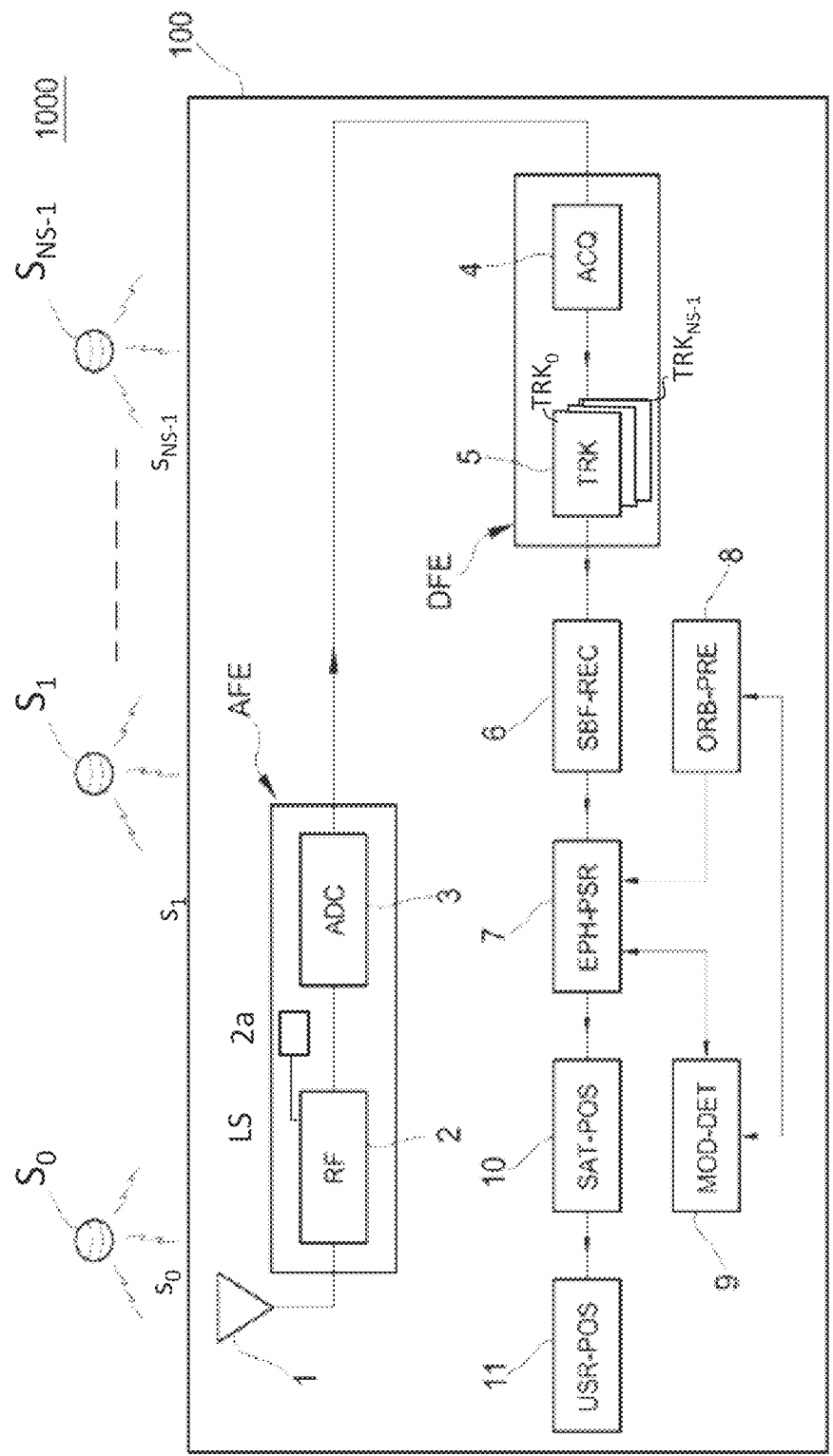
FIG. 1 is a schematic diagram showing a GNSS (Global Navigation Satellite System) system.

With reference to FIG. 1, which diagrammatically shows a GNSS Global Navigation Satellite System) system 1000 (such as, for example, Global Positioning System (GPS), Global'naya Navigatsionnaya Sputnikovaya Sistema (GLONASS), Galileo System, or other types of satellite-based positioning systems, such global satellite positioning system 1000 comprises a constellation of a number NS of satellites $S_1$-$S_{NS}$ and at least a receiving apparatus 100. The satellite signals used in the GNSS (Global Navigation Satellite System) are of the CDMA-type (Code Division Multiple Access). The satellite signals reception at the receiving apparatus 100 is implemented through the following, sequentially performed, standard steps: analog filtering, frequency conversion and digitization, acquisition, tracking, decoding and positioning.

The receiving apparatus 100 comprises an antenna 1, an analog receiving module AFE (Analog Front End), provided with a radiofrequency (RF) stage 2, and an analog-digital converter 3 (ADC), which can be implemented by hardware modules.

Further, the receiving apparatus 100 comprises a digital processing module DFE (Digital Front End), including an acquisition module 4 (ACQ), and a tracking module 5 (TRK).

Moreover, the receiving apparatus 100 is provided with a sub-frame recovery module (SBF-REC), an ephemerides processing and pseudo-range calculation module 7 (EPH-PSR), a satellites orbits prediction module 8 (ORB-PRE), a satellite type detecting module 9 (MOD-DET), a satellite position calculation module 10 (SAT-POS), and a user position calculation module 11 (USR-POS).

In a particular embodiment, acquisition module 4, tracking module 5 can be implemented by hardware, while the remaining modules 6-11 can be implemented by software. In addition, it is observed that the acquisition module 4 and tracking module 5 can also be implemented by a hardware and software combination.

The receiving apparatus 100 is provided with a central processing unit, memories (mass memory and/or working storage) and respective interfaces (not shown in figures), comprising a microprocessor or microcontroller, for running the software resident in it.

The following embodiments are described in a non-limiting way referring to the GPS technology. However the teachings of the present disclosure can also be applied to other satellite positioning systems.

When the receiving apparatus 100 operates, the antenna 1 receives a plurality of signals $s_0, \ldots, s_{NS-1}$ from one or more satellites $S_0$-$S_{NS-1}$ of the constellation of satellites operating in system 1000. For example, these signals can be modulated on a carrier having a frequency of about 1.5 GHz. Particularly, each received signal transports a pseudo-random code and a message for the data communication.

The pseudo-random code, known as CA code, for example at 1 MHz, is used for distinguishing a satellite from another, and enables the receiving apparatus 100 to measure the time instant at which has been transmitted a signal by a corresponding satellite. Pseudo-random code is implemented by a sequence of pulses, called chips.

The radio frequency stage 2 operates on the signals received by antenna 1 (of the analog type) and converts them to the base band or to an intermediate frequency. Analog-digital converter 3 converts the intermediate frequency signals to corresponding digital signals. The radio-frequency stage 2 operates the conversion at an intermediate frequency using the frequency of a local signal LS which may be supplied by a Temperature Compensated Crystal Oscillator (TCXO) 2a.

The acquisition block 4 identifies in the digital signals originated by the analog-digital converter 3 the satellites in visibility, testing their presence by trying to match their transmitted PRN (Pseudo Random Noise) code sequence, i.e., the CA code, with a corresponding local replica and when a peak confirmation is found it provides the initial GNSS information, i.e., code/frequency information to an elementary Intermediate Frequency tracking correlation block. Further, the acquisition module 4 detects a plurality of parameters associated to the satellites and used for time tracking the satellite.

The data navigation message transports data (for example at a bit rate equal to 50 Hz) and particularly is modulated based on the Binary Phase Shift Keying (BPSK) technique. Further, data navigation message is hierarchically divided in frames and sub-frames and transports several information, among them a plurality of parameters used for determining the orbit and consequently the position of satellites.

The tracking module 5 has plural channels, indicated by a channel index i from 0 to NS−1, in particular indicated as $TRK_0 \ldots TRK_{NS-1}$ and each is allocated to a different satellite of the constellation. Specifically, the tracking module 5 is configured to operate as a frequency locked loop. Based on a further embodiment, tracking module 5 is configured to implement a phase locked loop.

The tracking module 5 is configured to supply data to the sub-frame recovery module 6, as a time sequence of samples pairs, indicated with {I, Q}. Each sample {I, Q} is for example the result of a coherent integration, respectively in-step and quadrature, of a bit of 20 ms, performed by a correlator based on the modulation technique Binary Phase Shift Keying (BPSK). Each samples pair {I, Q} represents a transmitted bit.

As it is known in the field of the digital communication theory, each sample {I, Q} can be further interpreted as a phasor, by considering the value I and value Q as the real and imaginary parts of a bi-dimensional vector in the complex Cartesian plane.

Moreover, for each satellite, in the tracking module 5 the Doppler frequency and the transfer time of the GPS signal transmitted by a satellite $S_1$-$S_{NS}$ are determined.

The sub-frame recovery module 6, by means of suitable algorithms, decodes the different received sub-frames forming the navigation data message. The ephemerides processing and pseudo-range calculation module 7 stores the satellite orbit, as ephemerides data, and calculates the existent distances between the satellites and the receiving apparatus 100: such distances are called pseudo-range. By these calculated values, and the time for transferring the GPS signal, the satellite position calculation module 10 calculates the positions of the satellites expressed by 3D coordinates, at the moment of transmission.

The satellite orbit prediction module 8 can be activated for assisting the ephemerides processing and pseudo-range calculation module 7 and/or satellite position calculation module 10 when the ephemerides data are not available at the receiving apparatus 100.

The satellite type detecting module 9 is configured to determine the type of the tracked satellite and by it the solar radiation pressure model to be used in the orbit prediction by the satellite orbit prediction module 8, according to modes that will be described in the following as examples. The satellite type detecting module 9 enables to determine the type of satellite in order to select the solar radiation pressure model which better provides for the shape, mass and size of a satellite.

In this embodiment, the satellite position calculation module 10 operates on the time for transferring the GPS signal together with the reception time (known due to a clock inside the receiving apparatus 100). The satellite position calculation module 10 operates in order to evaluate how much time is required to the signal from each satellite for reaching the receiving apparatus 100, evaluating in this way the distance from the corresponding satellite (pseudo-range).

By a triangulation algorithm, the user position calculation module 11 calculates the position of the receiving apparatus 100 based on the distances of the receiving apparatus 100 preferably from at least four satellites and based on the positions of the same satellites, known at this processing stage. In the following, the position of the receiving apparatus 100 (practically coinciding with the user position) will be called "fix".

As mentioned, the tracking module 5 includes a plurality of channels, i.e., tracking correlation blocks which are usually let working in parallel each tuned on a different satellite PRN code and frequency, among the ones previously identified by the acquisition block 4, with the goal to confirm or eventually discard the acquisition hypothesis for every of them. For the confirmed satellites, after a startup refinement of the code and frequency initially provided by the acquisition block, the stable locked tracking phase starts. It consists into tightly following both the frequency offset (velocity) and the code phase (distance) of the satellite vehicle being analyzed and to demodulate the position and time information embedded in its bit stream. This information is then provided to a Kalman Filter to triangulate the receiver position.

The tracking channel as mentioned includes a correlator which comprises a PRN (pseudorandom noise) delayed sequence generator. The GNSS signals received at the receiver includes a ranging code modulated into the carrier, also called Pseudo-Random Noise (PRN) code, which spreads the spectrum and allows retrieving ranging information. Therefore, it is required that the tracking channel include a PRN delayed sequence generator, which generates PRN sequences which are early, punctual or delayed one with respect to the other to perform correlation with the ranging codes.

Figure 2:
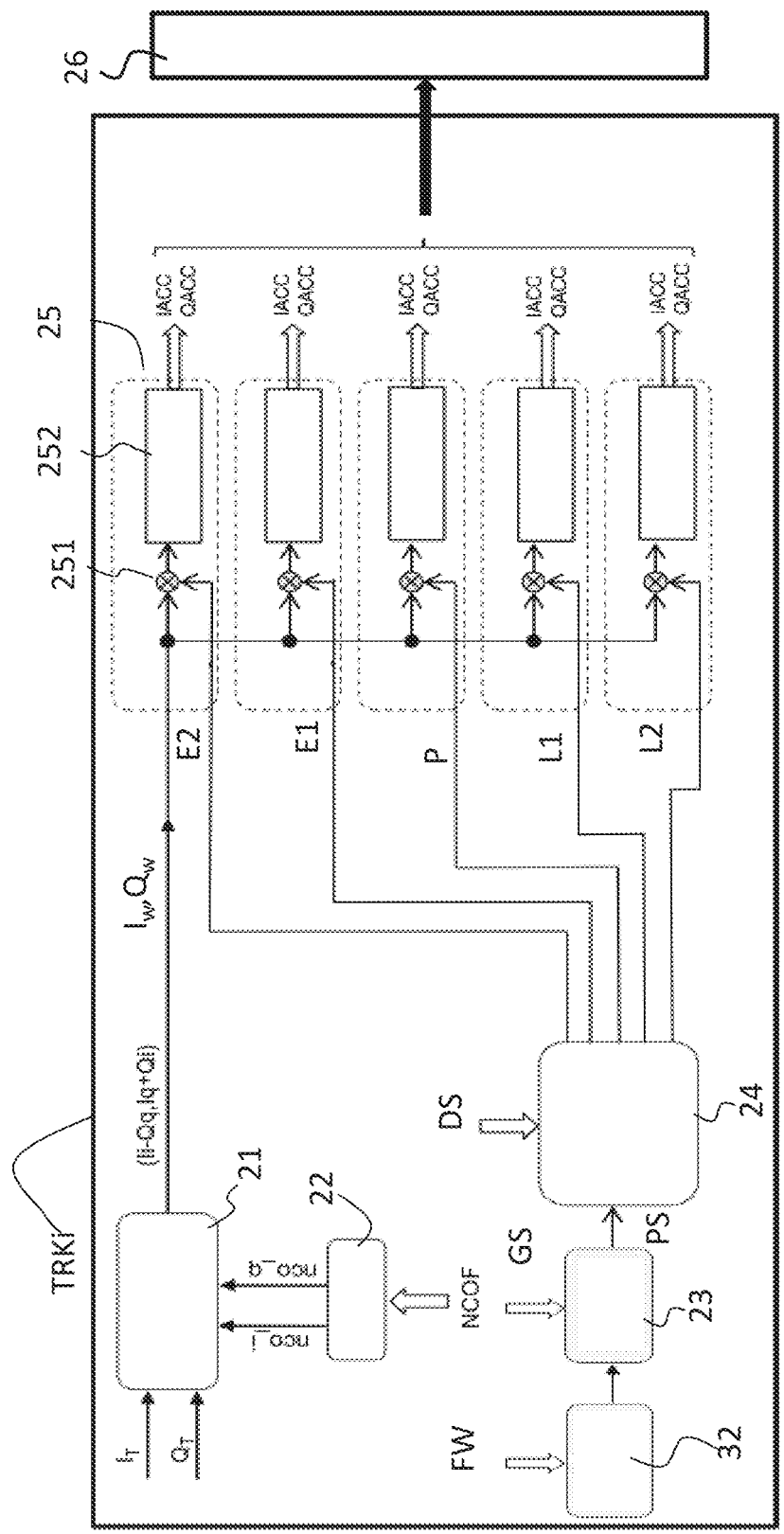
FIG. 2 is a schematic diagram of a tracking channel operating in a GNSS receiver apparatus.

In FIG. 2 it is shown schematically a tracking channel $TRK_i$ comprising an embodiment of a GNNS PRN delayed sequence generator 20. The GNNS PRN delayed sequence generator 20 basically comprises a GNSS PRN sequence generator 23 and a delayed sequence generator 24. A code Numerical Controlled Oscillator 32, NCO in the following, is also provided which is programmed to generate the Pseudo Random Noise, PRN in the following, code rate. For example, for GPS the code rate is Fchip=1.023 MHz. Such code NCO 32 receives a frequency word FW, setting the code rate Fchip, and a clock signal CK from the AFE stage 2.

More in detail, baseband in-step $I_T$ and quadrature $Q_T$ components of the GNSS signal received enter a module 21 configured to remove the frequency Doppler. Such module 21 to this regard receives from a carrier NCO (Numerical Control Oscillator) 22 respective in-step and quadrature frequencies nco_i and nco_q, generated by the carrier NCO 22 under the control of a NCO drive frequency NCOF, which corresponds to the receiver generated carrier. Module 21 therefore generates an in-step wiped component $I_W$ and a quadrature wiped component $Q_W$ of the GNSS received signal where the frequency Doppler (a Doppler Effect frequency offset caused by the reciprocal motions of the satellite and the receiving apparatus) is removed, i.e., wiped, which are brought as input to a bank of correlators 25 arranged in parallel, each of which receives at another input a delayed, punctual or early version of the PRN code generated by a delayed sequence generator 24. Specifically, in the example shown there are five correlators, $25_1$, $25_2$, $25_3$, $25_4$, $25_5$, which receive at one input the wiped components $I_W, Q_W$ and at the other input respectively a very early signal E2 (also VE), an early signal E1 (also E), a punctual signal P or prompt signal, a late signal L1 (also L), a very late signal L2 (also VL), which correspond to time-shifted replicas of the PRN code signal, shifted, as shown in the time diagram of FIG. 4, of a given interval of time one with respect of the other, starting from very early signal E2, which is early by two intervals of time with respect to punctual signal P, and arriving to very late signal L2, which is late by two intervals of time with respect to punctual signal P, which in general corresponds to the so-called Prompt code. Although the example shown refers to K=2 early and late sequences, the value K can be different, one, i.e., only three replicas, early, prompt and late, or greater than two.

With the reference number 23 is then indicated a GNSS PRN generator, which receives setting GS and generates a GNSS PRN sequence PS, i.e., PRN codes. The setting GS to originate a given PRN sequence PS are supplied by the acquisition side in the analog receiving module AFE along with the starting phase. The PRN sequence PS is brought as input to the GNSS PRN delayed sequence generator 24 which outputs signals E2, E1, P, L1, L2.

Each correlator includes a multiplier 251, which receives the two inputs from the module 21 and PRN generator 24, and supplies the sum at its output to a respective accumulator register 252, e.g., an integration and dumping block, which accumulates over an accumulation time of the correlator 25, and supplies accumulated in-step $I_{acc}$ and quadrature components $Q_{acc}$, which are supplied to a receiver processor to evaluate the result of the correlation and to find the correlation peaks. These techniques and the techniques employed to process the accumulated in-step $I_{acc}$ and quadrature components $Q_{acc}$ are known per se to the person skilled in the art and would not be further discussed in detail. Thanks to the correlation result with the PRN sequence advanced and delayed versions, the receiver is able to maintain a stable satellite tracking and get a high accuracy by using a discriminator algorithm.

As mentioned, in FIG. 3 it is shown the time diagram of the replica signals E2, E1, P, L1, L2, which are delayed one with respect to the other of a time delay D, while in FIG. 4A it is shown the correlation power, in absolute value, as a function of the normalized code phase, i.e., the phase of the replica normalized to the chip duration $T_c$, of such outputs signals, i.e., replicas E2, E1, P, L1, L2. Although the abscissa is correlation power, thus points on the curve are absolute correlation power values, e.g., the sum of the square of accumulated in-step $I_{acc}$ and of the square quadrature components $Q_{acc}$ for each replica, e.g., $I_{E2}^2+Q_{E2}^2$ for the very early replica E2, in this and in the following correlation diagrams, e.g., FIGS. 4B, 7A, 7B, for simplicity of representation are identified by the labels of the replica labels E2, E1, P, L1, L2 which originate them. The dotted line connecting the absolute correlation power values represents the tracking correlation curve. The idea is to sample the tracking correlation curve in the right position by the 2K+1 correlation point (5 in this example, with K=2 i.e., E2, E1, P, L1, L2 signals).

As shown in FIG. 4B, which shows a logic correlation point diagram, i.e., the power value ($I^2+Q^2$), i.e., the sum of the square of accumulated in-step $I_{acc}$ and the square of quadrature components $Q_{acc}$, of the correlation between the sequence E2, E1, P, L1, L2 and the incoming signal from the block 252 (in practice it is a sampling of the ideal tracking correlation curve at certain normalized code delay T according to the settings), a maximum delay or time spacing SM/2 between signal E2 or L2 and signal P is fixed, thus the total, early-late, spacing SM between replicas, i.e., between signal E2 and L2, is also fixed.

To compensate peak tracking error, Very Early, Early, Prompt, Late and Very Late power values, i.e., correlation power values determined by replica signals E2, E1, P, L1, L2, are then the input for a discriminator function, i.e., a discriminator module 26. Its output is used to produce the control feedback signal to align the local replica to the incoming satellite signal, e.g., supplying the control feedback signals to the code NCO 32. More specifically loop filters are used to obtain code feedback signals and carrier feedback signals. The corresponding modules and circuits are known per se to the person skilled in the art and are not shown for simplicity in FIG. 2.

The input error/output feedback relationship is technically called S-Curve.

Different spacings in time (or delay) of the five amplitude values corresponding to replicas E2, E1, P, L1, L2 are possible (so different S-curves) and a noisiness estimate for the tracking channel $TRK_i$ is achievable starting from the discriminator output, as also discussed in the following.

The most common discriminator functions used to compensate the input residual error are, as shown below, the EML (Early Minus Late, two points, E-L used) and the DD (Double Delta, five points, VE . . . P . . . VL used) discriminator.

$$D_{EML}=((I_{E1}^2+Q_{E1}^2)-(I_{L1}^2+Q_{L1}^2))/((I_{E1}^2+Q_{E1}^2)+(I_{L1}^2+Q_{L1}^2))$$

$$D_{DD}=a*((I_E^2+Q_E^2)-(I_L^2+Q_L^2))-b*((I_{E2}^2+Q_{E2}^2)-(I_{L2}^2+Q_{L2}^2))/[((I_E^2+Q_E^2)-(I_L^2+Q_L^2))+((I_{E2}^2+Q_{E2}^2)-(I_{L2}^2+Q_{L2}^2))],$$

where I, Q are the in-step and quadrature components resulting from the correlation with the different replicas E2, E1, L1, L2, indicated by the subscript. a and b are weights which value can be set.

An indication of the correct tracking, i.e., a parameter representative of the input noise, is adopted in the solution here described, indicated with DDM5, which represents a weighted average of the EML and DD discriminator outputs to qualify the tracking goodness:

$$DDM5=(\alpha D_{EML}+\beta D_{DD})/(\alpha+\beta),$$

$\alpha$ and $\beta$ being weights which value can be set in 0 . . . 1 with their sum equal to 1 for normalization, where discriminators $D_{EML}$ and $D_{DD}$ are standard DDL discriminators outputs acting on two (E-L) and five (VE-E-P-L-VL) points respectively.

In ideal conditions (tracking without any offset) both EML and DD discriminator outputs are zero and the noise parameter DDM5 is zero as well. The noise parameter DDM5 increases instead with input noise on the received signal $s_i$.

Figure 6:
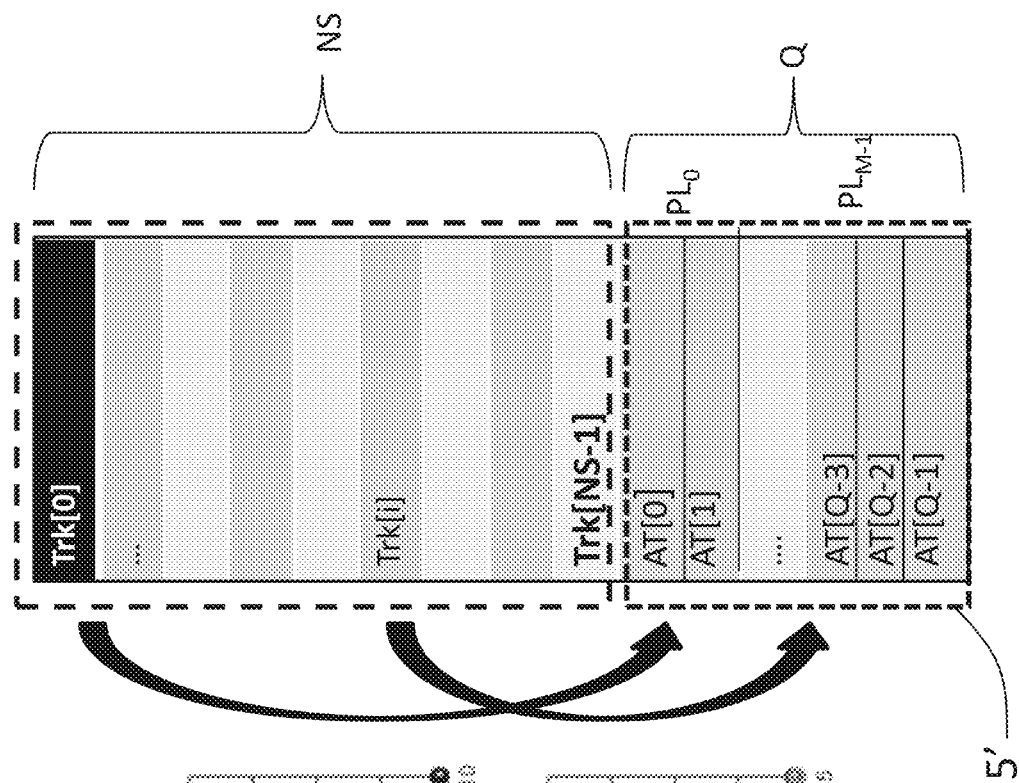
FIG. 6 is a schematic diagram of a tracking channel according to the solution here described.

According to the solution here described to detect the spoofing, the solution provides a GNSS apparatus analogous to the GNSS apparatus 100 of FIGS. 1 and 2, but equipped with a tracking block 5' in which, as shown in FIG. 6, there is a set of tracking channels logically divided into: a first number NS of standard tracking channels $TRK_i$, corresponding to the number NS of satellites in the constellation to track, used for standard positioning purpose, with E2-E1-P-L1-L2 points closer to the peak point for fine peak identification; and a second number Q of auxiliary tracking channels $AT_j$, j=0 . . . Q−1, arranged in a number M of monitor channels $PL_0$ . . . $PL_{M-1}$, which are used for spoofing detection. Each monitor channel $PL_k$, k=0 . . . M−1, thus includes a respective set or pool of auxiliary tracking channels $AT_j$ linked to a specific tracking channel $TRK_i$, i.e., a master tracking channel, among the N standard tracking channels $TRK_i$ to be monitored in order to check for spoofing attack on such master tracking channel $TRK_{ii}$.

The auxiliary tracking channel $AT_j$ has substantially the same architecture, components and circuit topology, of the tracking channel $TRK_i$ shown in FIG. 2, receives the same received signal $I_T$, $Q_T$ of the tracking channel $TRK_i$ for the monitoring of which are used, and operates with the same Pseudo Random Noise sequence PS which is distinctive of the satellite signal $s_i$ on which the tracking channel $TRK_i$ operates. The only difference is that the GNSS PRN delayed sequence generator 24 outputs replica signals, very early E2', early E1', punctual P', late L1', very late L2', which are spaced one with respect to the other of a delay value D', i.e., an auxiliary or second delay value, which is greater with respect to the delay value D, i.e., a standard or first delay value, between the replicas E2, E1, P, L1, L2 of the master tracking channel $TRK_i$, while the respective replicas of the auxiliary tracking channels, e.g., $AT_j$ and $AT_{j+1}$, in the same monitoring channel $PL_k$ monitoring such master tracking channel $TRK_i$ are delay shifted one with respect to the other.

Figure 5A:
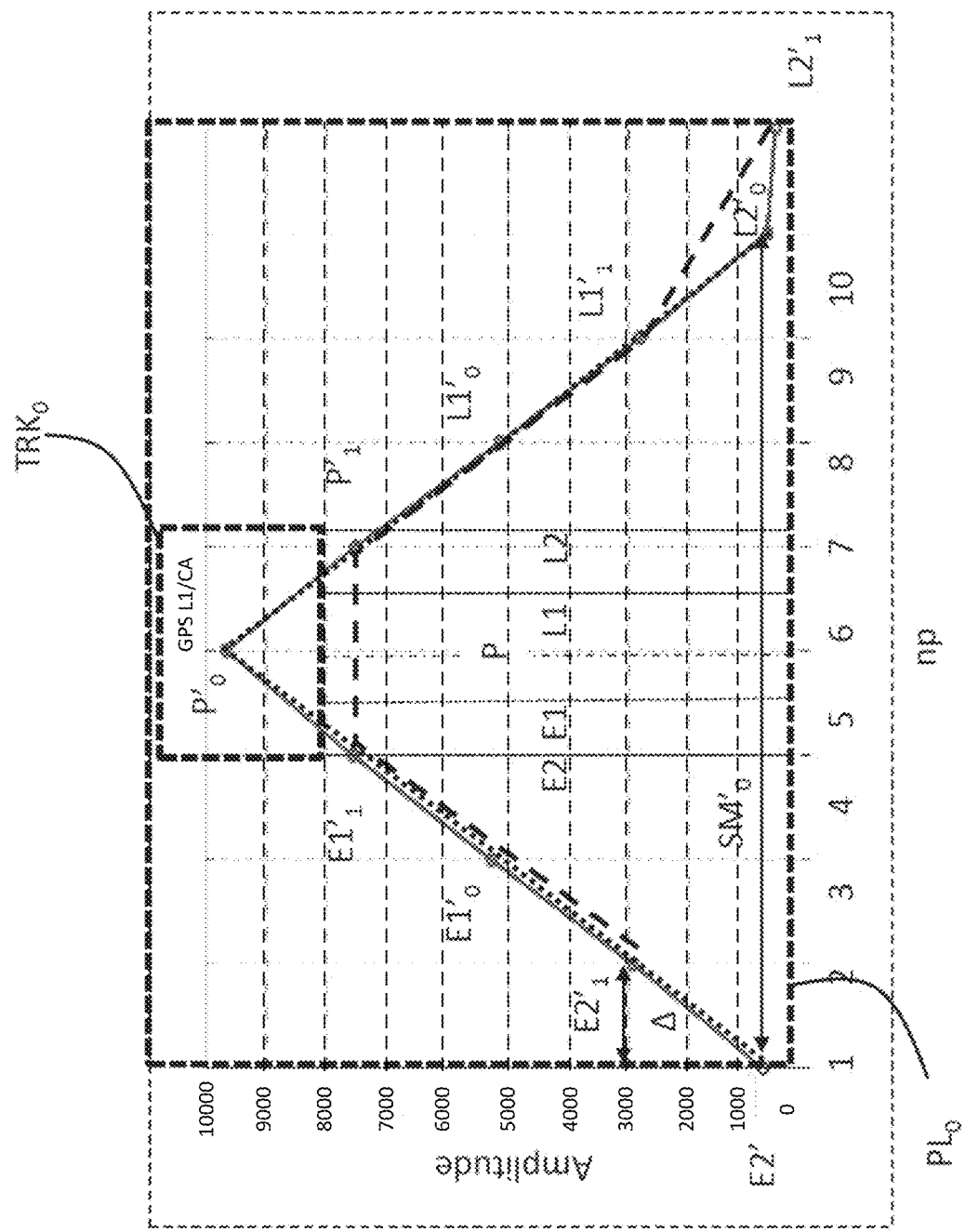

In FIG. 5A is shown a diagram representing a monitor channels $PL_0$ associated to the standard tracking channel $TRK_0$ as per FIG. 6, such channels being an example of generic channels, $PL_k$, $TRK_i$.

The diagram of FIG. 5A shows the correlation amplitude versus the number of points np, the number of points np being the index of a correlation point in the series of correlation point, arranged on the abscissa according to the phase code τ, as also indicated in FIG. 4A. Thus, monitor channels $PL_k$ have a greater number of points, e.g., 10 or 15 correlation points instead of just 5, with respect to the standard tracking channels $TRK_i$, obtained allocating a plurality of auxiliary tracking channels $AT_j$, e.g., two or three auxiliary tracking channels $AT_j$, in parallel to obtain a wider delay line over which detect autocorrelation shape anomalies. In FIG. 5A it is shown a monitor channel $PL_0$, in continuous line, with 10 points, that is implemented, in the exemplary case, by the auxiliary channels $AT_0$ and $AT_1$, which correlation curves are represented by a dotted line and dashed line respectively. A dashed window around such points indicates the monitor channel $PL_0$, with 10 points which are spaced with a wider maximum, i.e., very early-very late, time spacing $SM'_0$ or $SM'_1$ associated to the replicas $E2'_0, L2'_0, E1'_0, L1'_0, P'_0$ for the centered auxiliary channel $AT_0$ and $E2'_1, L2'_1, E1'_1, L1'_1, P'_1$ for the shifted auxiliary channel $AT_1$ while a smaller dashed window around the correlation peak indicates the standard tracking channel $TRK_0$ with standard replicas E2, E1, P, L1, L2 with a time spacing SM, smaller than the wider maximum delay or time spacing $SM'_0$ or $SM'_1$. Thus, a delay D' between the replicas of the auxiliary channels, originating phase code spacing $SM'_0$ or $SM'_1$, may be for instance of a 8/16 of the chip frequency $f_{chip}$ against a 1/16 of the chip frequency $f_{chip}$ which may be the delay D between the replicas used in the standard tracking channels $TRK_i$.

The solution here described provides that the tracking channels $TRK_i$ are investigated for spoofing periodically and the selection of the tracking channels $TRK_i$ to check for spoofing may be performed according to the noisiness status as recorded by the noise parameter, in one embodiment a DDM5 indicator value better described in the following.

Satellites, i.e., tracking channels $TRK_i$, with the worst noisiness status, e.g., DDM5 indication, are replicated in a respective monitor structure $PL_k$ and a wider autocorrelation analysis, i.e., on the wider phase code spacing SM', is executed for them.

For instance, a number M of 8 monitoring channels $PL_k$ each including two or three auxiliary tracking channels $AT_j$ may be allocated to check up to 8 spoofed satellites, i.e., 8 tracking channels $TRK_i$ in the same time. Thus, the total number of tracking channels is NS+Q, which may, in case of two auxiliary channels for each monitoring channel, result in providing at least 24 tracking channels, i.e., NS+M*2. In the example, there are 64 tracking channels, of which a number NS of 48 are allocated to standard tracking channels and Q=16 auxiliary channels $AT_j$ are used to monitor M=8(×2) of them. This allocation is flexible and software configurable.

Also, as mentioned a timed routine may be performed which updates the allocation of the monitoring channels $PL_k$ introducing new satellites in the monitor structure whereas their noise parameter DDM5 is worse, i.e., greater, than the one of tracking channel tracking a satellite already under test (continuous monitor update).

Pool monitoring is thus designed to be robust through reacquisition (e.g., short obscuration induced by malicious attacker).

Figure 7A:
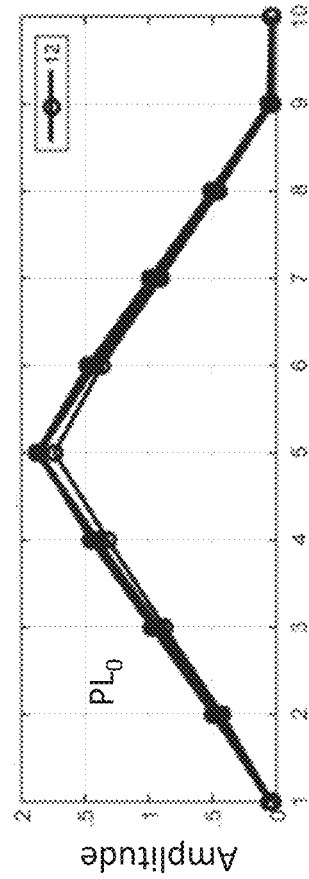
FIGS. 7A and 7B, collectively
Figure 7B:
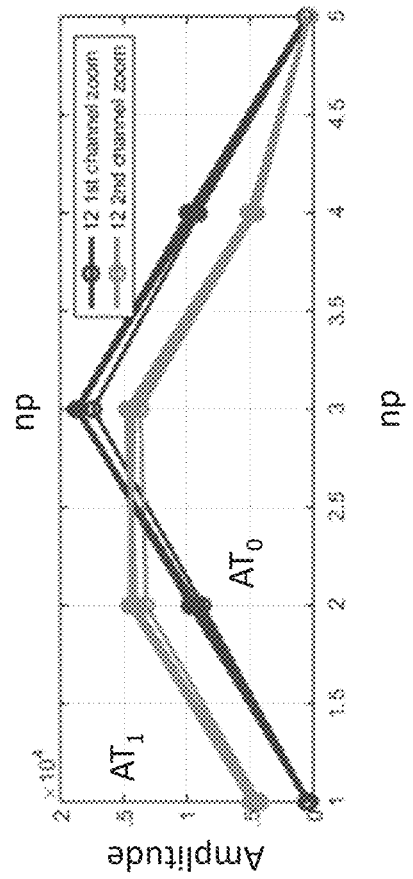

In FIG. 7A the upper diagram represents by way of example the overall monitor channel $PL_0$ correlation amplitude shape, with 10 points, that is implemented, in the exemplary case, by the auxiliary channels $AT_0$ and $AT_1$ correlation amplitudes which are represented in the lower diagram of FIG. 7B and have each 5 points. Both diagrams have number of points np as abscissa, like in FIG. 5. In the lower diagram auxiliary channels $AT_0$ and $AT_1$ are represented aligned with respect to their index points np, which go from 1 to 5. They correspond to the correlation points 1-3-5-7-9 and 2-4-6-8-10 respectively of the monitoring channel correlation curve in FIG. 7A.

Both auxiliary channels $AT_0$ and $AT_1$ have their peak logically set to be identical to the tracking channel, e.g., $TRK_0$, to which are associated, however for the shifted auxiliary channel $AT_1$ the peak is delay shifted, of a delay Δ, i.e., a shift delay or third delay, as shown in FIG. 5B, with respect to the auxiliary channel $AT_0$, which is shown instead in FIG. 5C, to allow a complete reconstruction over ten points and avoid wasting a correlation point on the peak which is already obtained by the other auxiliary channel $AT_0$. Shift delay Δ, which in FIG. 5 is represented as phase code, is implemented as a time shift between the corresponding replicas of the auxiliary channels, and in the example may be equal to the auxiliary delay D', e.g., 4/16 of the chip frequency, in order to have equally spaced correlation points over the total or maximum spacing SM'.

Thus, in FIGS. 5B and 5C it can be observed that the peak of the shifted auxiliary channel $AT_1$, for prompt replica $P'_1$, is delayed by shift delay Δ with respect to the peak at the prompt replica P of the standard tracking channel $TRK_i$. The peak of the centered auxiliary channel $AT_0$ for prompt replica $P'_0$ is on the peak at the prompt replica P of the standard tracking channel $TRK_i$.

The early and late replica of both auxiliary channels $AT_0$ and $AT_1$ are space 2Δ apart from their respective prompt replicas, while their very early and very late replicas are 4Δ apart from their respective prompt replicas. It may be noted that the correlation point of the very late replica $L2'_1$ is out of the shape.

Shift delay Δ is in the example 4/16Fchip so that the correlation powers of very early and very late replicas are substantially zero, i.e., the spacing SM' is [+1chip, −1chip].

When a satellite signal $s_i$ is monitored by a monitoring channel $PL_k$ a quality indicator is computed on the amplitude values of the monitoring channel $PL_k$ in order to verify whether it is under spoofing attack or not. Such quality indicator, indicated as DDM10, is a normalized "unbalance" power detector. In the case of a monitor channel, e.g., $PL_0$, with two auxiliary channels $AT_0$ and $AT_1$, the quality indicator DDM10 is:

$$DDM10 = ((E2'_0 - L2'_0) + (E1'_0 - L1'_0) + (E2'_1 - L1'_1) + (E1'_1 - P'_1))/P'_0$$

where subscripts 0 and 1 stands for the auxiliary channel $AT_0$, centered on the correlation peak, and $AT_1$, shifted of time Δ, used in FIG. 7B to produce the extended overall autocorrelation shape of the monitor channel $PL_0$ in FIG. 7A. $P'_0$ is the correlation power for the punctual signal for the first channel $AT_0$, aligned on the correlation peak, which is used to normalize the indicator value. As mentioned E2', L2', P', E1', L1' indicate in the formula of DD5 the correlation power for the replicas indicated by the same reference.

In other words, in FIG. 7B which represents a situation without spoofing, the quality indicator DDM 10 is a sum of the differences between the power of the replicas having nominally the same values in each auxiliary channel, in particular with respect to the nominal tracked peak point.

In nominal conditions the DDM10 discriminator output value is zero.

Figure 8A:
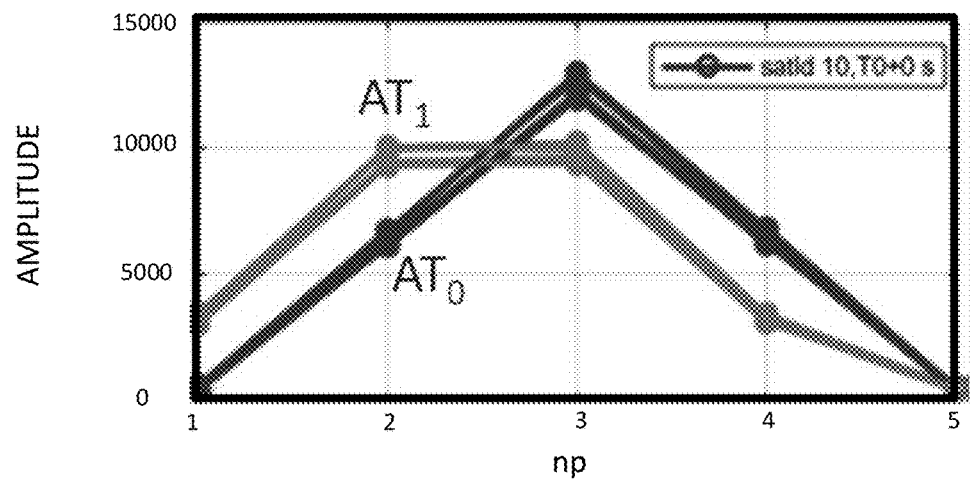
FIGS. 8A, 8B and 8C, collectively
Figure 8B:
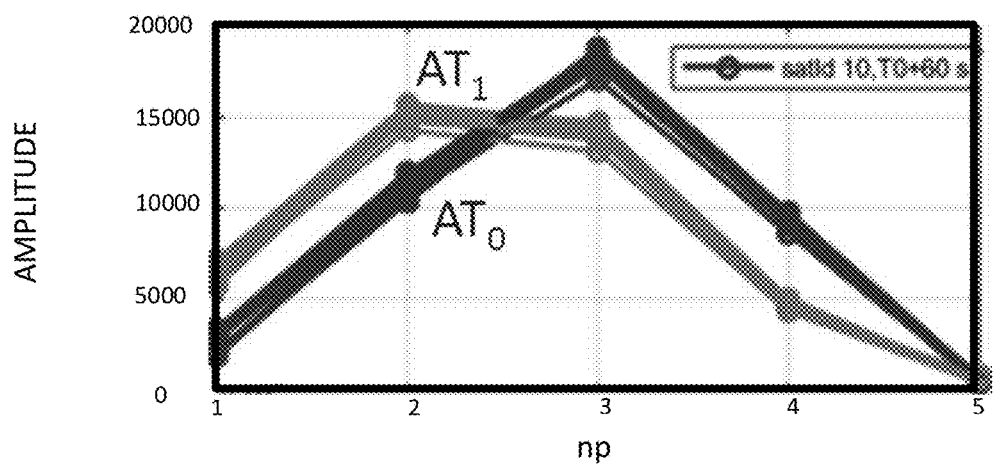
Figure 8C:
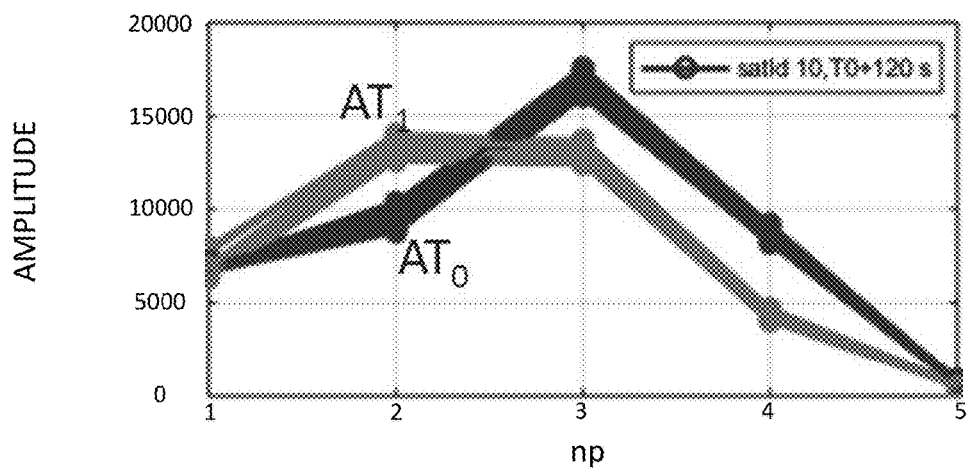

In FIG. 8A, 8B, 8C are shown the auxiliary channels $AT_0$ and $AT_1$ correlation amplitudes plotted verso the points NP, like in FIG. 7B, in case of a spoofing signal. It is In FIG. 8A, a time t=0 s, the auxiliary channels $AT_0$ and $AT_1$ correlation amplitudes are both symmetric. There is no spoofing or the spoofing signal is weaker than the signal so of satellite $S_0$ received and tracked in the tracking channel $TRK_0$. The differences between the power of the replicas having nominally the same values in each auxiliary channel in DDM10 tend to be zero.

In FIG. 8B, at time t=60 s, the symmetry starts deteriorating. The spoofed signal $ss_0$ with a greater power amplitude has seized the tracking channel which is thus locked on such spoofed signal $ss_0$. The spoofed signal $ss_0$ is no longer aligned with the original satellite signal, thus the tails to the left are unbalanced with respect to the tails to the right, thus the differences between the power of the replicas having nominally the same values in each auxiliary channel in DDM10 start to increase.

In FIG. 8B, at time t=120 s, the symmetry is completely destroyed. The spoofed signal $ss_0$ with a greater amplitude controls the main peak, while the original weaker satellite signal determines an increase on the left tail, which determines in its turn a remarkable increase in the differences between the power of the replicas having nominally the same values, i.e., to the left and right of the peak, in each auxiliary channel.

Figure 9A:
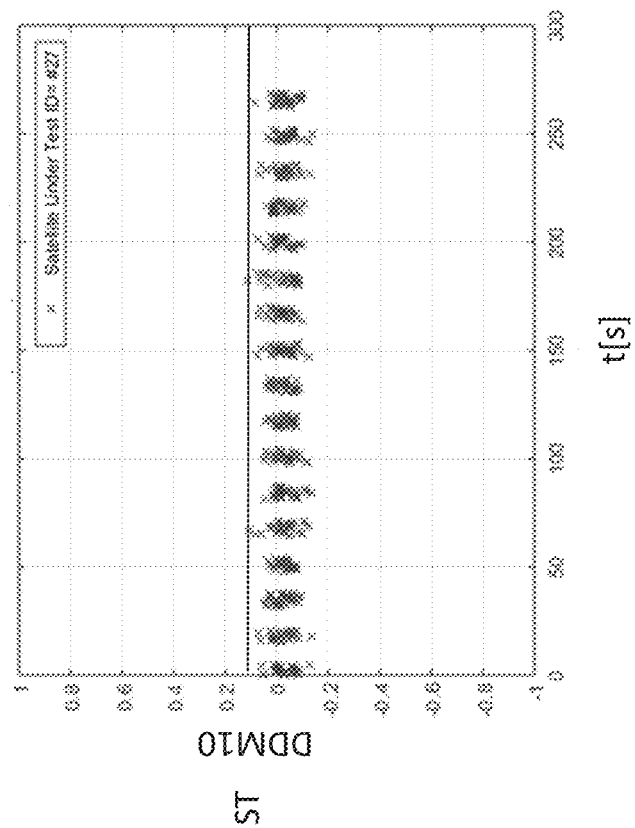
FIGS. 9A and 9B, collectively

FIG. 9A shows a diagram representing the DDM10 values in time t for a spoofed monitoring channel $PL_0$.

As it can be seen for the DDM10 is above a spoof detection threshold ST, in particular for a spoof detection time td.

Figure 9B:
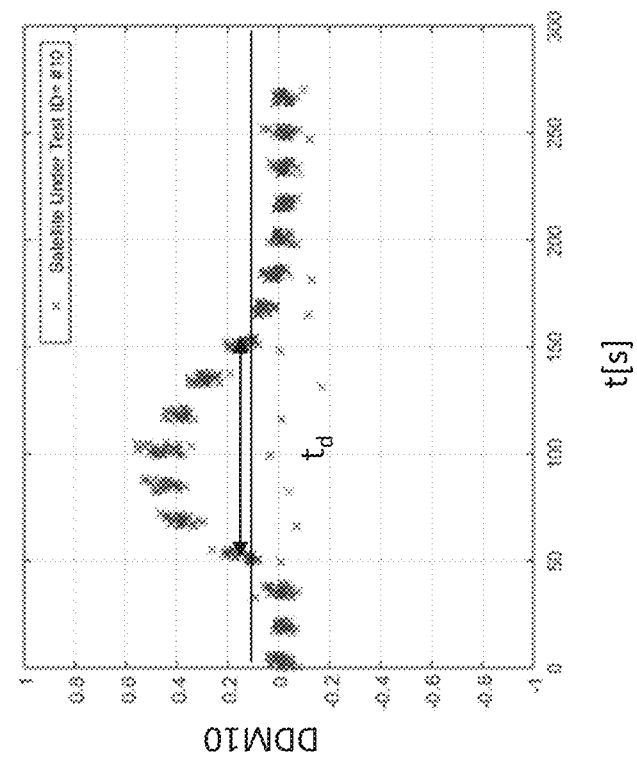

FIG. 9B shows a diagram representing the DDM10 values in time t for a not spoofed monitoring channel $PL_0$.

The value of the spoof detection threshold ST is set by statistical analysis in no attack condition, as well as the spoof detection time td. The latter is the time above threshold after which a spoofing signal is detected, in order to avoid false alarms. In variant embodiments this time could be also zero, i.e., a spoofing signal is considered detected as soon as DDM10 for a monitored channel is above threshold a spoofing attack is signaled out.

Thus, anomalies on extended correlation shaping from monitor channels may be signaled out on NMEA/RTCM 3 to indicate the attack is ongoing on the constellation.

In an embodiment, upon spoofing detection, measurements affected by spoofing are gated and not provided outside to avoid pollution.

Additionally, detection of anomalies on multipoint shaping can trigger the adoption of a silent out of chip parallel continuous tracking trial (on a further extra channel) setting the prompt of such extra channel far from the main peak currently being tracked and potentially affected by the spoofer.

Also, it can be used the spatial separation between the spoofed peak measurement and the predicted satellite position estimation to discard the spoofing signal and reacquire on the genuine original satellite signal when the two quantities are well separated, (next slide scheme).

This necessitates of a complete genuine versus spoofer spatial identification (for instance greater than 300 m separation for the GPS case) to have the two autocorrelation function separated.

This is intended as a mechanism to recover (and re-lock) to the genuine satellite signal as soon as the spoofed prompt is far enough and the action of the spoofer is established and in place.

It relies on a stable and parallel double peak independent recognition by code separation to continue positioning on the right tracking by excluding the spoofer tracking, as also discussed with reference to FIG. 11 in the following.

Identification of the genuine satellite signal vs. spoofed signal can be done by residual analysis and/or relying on another constellation position fix.

In FIG. 10 it is shown a flow diagram representing an embodiment of a method 400 for detecting a spoofing signal in a GNSS receiver 100 operation of detection of a spoofing signal in a GNSS receiver 100, comprising an operation 410 of receiving at least a satellite signal $s_i$ in the constellation signals $s_0 \ldots s_{NS-1}$, followed by acquiring 420 such satellite signal $s_i$ as received signal $I_T, Q_T$ in the acquisition module 4.

Then an operation 430 of tracking the at least a satellite signal $s_i$ is performed, which includes operating with a receiver comprising a set of tracking channels in the tracking module 5' comprising a first subset NS of standard tracking channels $TRK_i$ operating with a set of replicas spaced of a first delay value D and a second subset Q of auxiliary channels $AT_j$ spaced of a second time delay D' value greater than the first delay value D. As mentioned, this may include providing a tracking module with NS+Q hardware tracking channels like the one described with reference to FIG. 2, of which NS are used to track corresponding satellite signals and Q are configured, e.g., via software, to operate as auxiliary channels with respect to one or more of the standard channels in the first subset. As already indicated NS+Q may be 64, NS=48 and Q=16, each pair of the Q auxiliary channels being configured, e.g., via software programming of delays, to form a respective monitoring channel operating with replicas which are spaced for a same auxiliary channel of an auxiliary delay value D' greater than the standard delay value D and delay shifted of a shift delay Δ one with respect to the other.

Such tracking operation 430 includes, as shown with reference to FIG. 2, receiving the received signal $I_T, Q_T$ in at least one standard tracking channel $TRK_i$ comprising a bank of correlators 25 receiving in-phase $I_w$ and quadrature $Q_w$ versions of such received signal $I_T, Q_T$, generating a Pseudo Random Noise sequence PS at a code frequency Fchip set by a code Numerical Controlled Oscillator 32 comprised in the standard tracking channel $TRK_i$ determining a code rate, performing a GNSS Pseudo Random Noise delayed sequence generation, including generating, on the basis of the Pseudo Random Noise sequence PS received from the GNSS Pseudo Random Noise sequence generator 23, a set of replicas of the Pseudo Random Noise sequence PS comprising at least one punctual P, one early E1 and one delayed L1 replica of the Pseudo Random Noise sequence PS, correlating the received signal $I_T, Q_T$ with each replica in the set of replicas of the Pseudo Random Noise sequence PS to obtain amplitude correlation values.

The tracking operation 430 of the at least a satellite signal $s_i$ provides its output, as the same output of tracking module 5 in FIG. 1, to an operation 440 of computing user's position, velocity and time, which for instance comprises the sequence of operations performed by modules 6-11 in FIG. 1. In other words, operations 430 and 440 implement the standard operations of receiver 100.

Then the method here described includes performing in parallel with the tracking operation 430 an operation 500 of monitoring at least a tracking channel $TRK_i$ allocating a corresponding monitoring channel $PL_k$ comprising a plurality of auxiliary tracking channels $AT_j$ in the second set Q of auxiliary channels, having respective replicas E1', P1', L1' which are delay shifted one with respect to the other, i.e., of a time or phase code delay Δ, such auxiliary tracking channels $AT_j$ receiving the same received signal $I_T, Q_T$ of the monitored tracking channel TRK and operating with the same Pseudo Random Noise sequence PS.

Such monitoring operation 500 includes in the embodiment here described an operation of measuring 510 a parameter representative of the input noise, i.e., DDM5 on one or more of the tracking channels TRK.

Then it is performed an operation 520 of verifying if the value of the parameter representative of the input noise DDM5 is greater than a given noise threshold ST in at least one of the tracking channels TRK, In the affirmative, it is performed an operation 530 of allocating a corresponding monitoring channel $PL_k$ comprising a plurality of auxiliary tracking channels AT in such second set Q of auxiliary channels, having respective replicas E1', P1', L1' which are delay shifted one with respect to the other, such auxiliary tracking channels $AT_j$ receiving the same received signal $I_T$, $Q_T$ of the monitored tracking channel $TRK_i$ and operating with the same Pseudo Random Noise sequence PS.

Then it is performed an operation 540 of calculating a shape anomaly factor, e.g., parameter DDM10, as a function of the correlation amplitude values of the auxiliary tracking channels $AT_j$ associated to the master tracking channel $TRK_i$, which is followed by an operation 540 of verifying if the shape anomaly factor DDM10 is greater than a given shape anomaly threshold ST, in particular for a given spoof detection time $t_d$.

In the affirmative, it is provided signaling 550 detection of a spoofed signal $ss_i$ on the monitored tracking channel $TRK_i$.

It is underlined that in variant embodiments the monitoring operation 500 may not necessarily perform the operations 510 and 520, i.e., perform operation 530 upon the condition a measured parameter is satisfied, e.g., it can simply perform the operation 530 on all the tracking channels or on a determined subset of the tracking channels. Also, as mentioned operations 510 and 520 can be performed by polling all the tracking channels, performing allocation operation 530 according to a ranking of the tracking channels according the noise parameter value, e.g., the tracking channels $TRK_i$, with the worst DDM5 indication are replicated in a respective monitor structure $PL_k$.

As mentioned, upon signaling 550 the detection of a spoofed signal, the method in variant embodiments can provide different action, for instance an alert, e.g., NMEA/RTCM 3 message, can be send and/or the output of the tracking channel $TRK_i$ with the spoofed signal can be gated.

In a preferred embodiment shown in FIG. 10, after signaling 550 detection of a spoofed signal $ss_i$ on the monitored tracking channel $TRK_i$, a procedure 600 is performed which includes in a step 610 performing a runtime consistency check between the satellite predicted position, which is obtained by Ephemerides Extrapolation and the d Range Peak point measurement outputted by the monitored tracking channel $TRK_i$.

Figure 11:
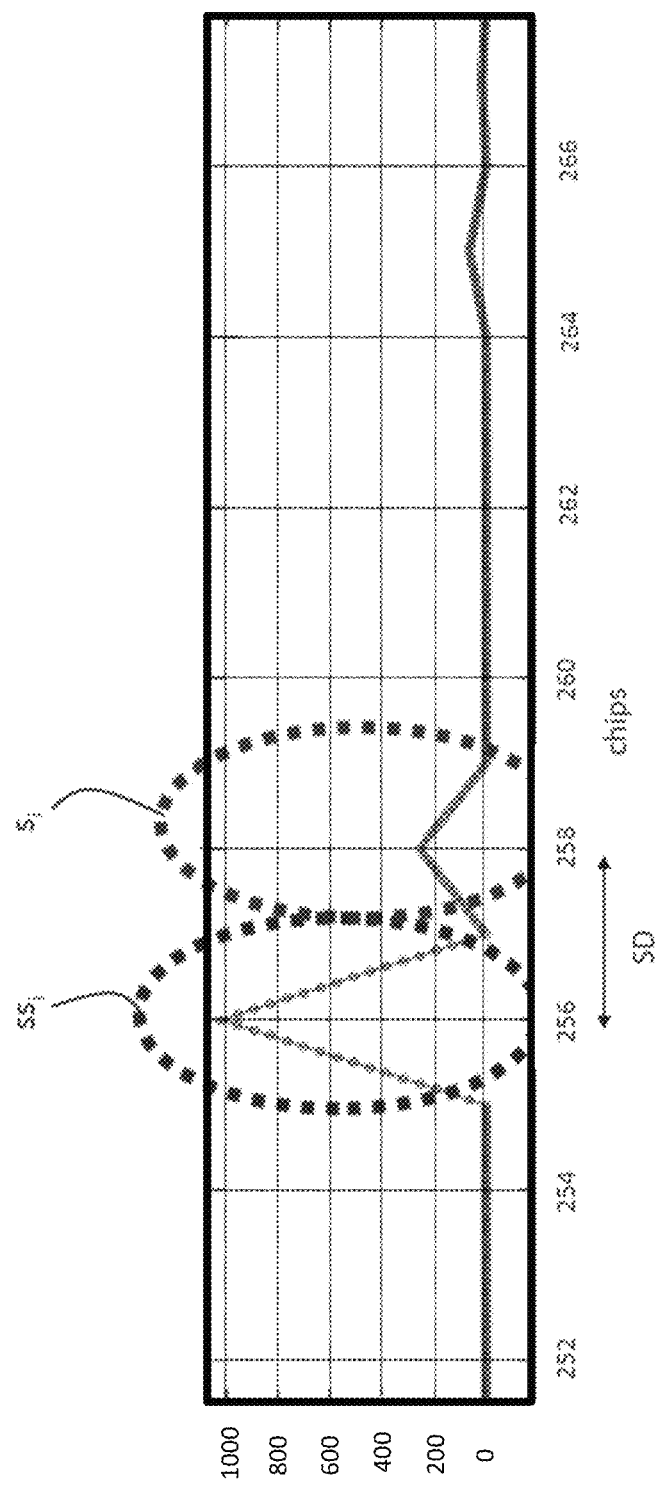
FIG. 11 is a time diagram of signals used by the method of FIG. 10.

In a step 620 is verified if a spatial separation between the spoofed signal $ss_i$ and the original satellite signal $s_i$ peaks is greater than a given separation distance, for instance greater than two chips, as shown in FIG. 11, which corresponds to 600 meters for GPS.

In the affirmative, it is performed an operation 560 of discarding the current tracked Peak point monitored tracking channel $TRK_i$ which is determined by the spoofed signal $ss_i$ and of reacquiring the satellite signal $s_i$ on such predicted position obtained at step 610.

FIG. 11 shows the by the correlation peaks of the spoofed signal $ss_i$ and of the satellite signal $s_i$, as a function of the number of chips, which are spaced of a separation distance SD of more than 1 chip, which in GPS corresponds to 300 meters.

As it can be deduced by the discussion above, the solution here described in its simplest form requires simply providing, for the tracking channel which is desired to monitor, i.e., the master tracking channel, in order to detect spoofing, to provide generation of generating a further plurality of replicas, e.g., E2', E1', P', L1', L2' of the Pseudo Random Noise sequence PS of such master tracking channel $TRK_i$ having a respective time spacing SM' which is greater than the given time spacing SM on which operates the set of replicas E2, E1, P, L1, L2 used for standard tracking, then correlating the received signal, e.g., $I_w$, $Q_w$, of the master tracking channel $TRK_i$ with each replica in such further plurality of replicas of the Pseudo Random Noise sequence PS to obtain further amplitude correlation values, then calculating, e.g., operation 540, a shape anomaly factor DDM10 as a function of the further correlation amplitude values determined by the further plurality of replicas E2', E1', P', L1', L2', verify, e.g., operation 550, if the shape anomaly factor DDM10 is greater than a given shape anomaly threshold, ST, in the affirmative, signaling, 560, detection of a spoofed signal $ss_i$ on such monitored or master tracking channel $TRK_i$.

This is preferably performed by providing auxiliary channels, as described in the method of FIG. 10, i.e., by a receiver apparatus which comprises a set of tracking channels 5' comprising a first subset NS of tracking channels operating with a set of replicas spaced of the given time spacing and a second subset Q of auxiliary channels which replicas E2', E1', P', L1', L2' are spaced of such second spacing SM' greater than the given time spacing (SM), more in particular comprising a first subset NS of tracking channels operating with a set of replicas spaced of a first delay value D and a second subset Q of auxiliary channels spaced of a second delay value D' greater than the first delay value D.

The receiver apparatus in general comprises an arrangement for detecting a spoofed signal $ss_i$ comprising a GNSS Pseudo Random Noise sequence generator for generating a further plurality of replicas, e.g., E2', E1', P', L1', L2' of the Pseudo Random Noise sequence PS of the master tracking channel $TRK_i$ having a respective time spacing SM' greater than the given time spacing SM, such arrangement being further configured to correlate the received signal $I_w$, $Q_w$ at least a tracking channel $TRK_i$ with each replica in the further plurality of replicas of the Pseudo Random Noise sequence PS to obtain further amplitude correlation values, calculate 540 a shape anomaly factor DDM10 as a function of the further correlation amplitude values determined by the further plurality of replicas E2', E1', P', L1', L2', verify 550 if the shape anomaly factor DDM10 is greater than a given shape anomaly threshold ST, in the affirmative, signal 560 detection of a spoofed signal $ss_i$ on the monitored tracking channel $TRK_i$. This arrangement for detecting a spoofed signal $ss_i$ may be preferably arranged in auxiliary channels $AT_j$ as described above replicating the architecture of the tracking channel $TRK_i$ and operating with the same received signal $I_w$, $Q_w$ and Pseudo Random Noise sequence PS. In embodiments, such respective time spacing SM' greater than the given time spacing SM is such that correlation powers of the most early and most late replicas defining such respective time spacing SM' are substantially zero, in particular the respective spacing SM' is [+1chip, −1chip].

However, in variant embodiments, the arrangement for detecting a spoofed signal $ss_i$, may include in the tracking channel itself both the components for the standard tracking and for the spoofing detection, i.e., a single tracking channel module including a GNSS Pseudo Random Noise sequence generator generating both the set of replicas of the Pseudo Random Noise sequence PS with a given spacing SM and the further plurality of replicas E2', E1', P', L1', L2' having a respective time spacing SM' greater than the given time spacing SM. Of course such single tracking channel may include corresponding banks of correlators to correlate the further plurality of replicas E2', E1', P', L1', L2' with the received signal, as well as the block for performing calculation 540 of the DDM10 parameter and the blocks for performing verification operation 550 and alert operation

560. For instance, such single channel may generate 15 replicas, 10 with a wider overall spacing SM' corresponding e.g., to channels $AT_0$, $AT_1$, and 5, with the narrower spacing SM for performing standard tracking, as shown for instance in FIG. 5A.

As mentioned, preferably the overall covered spacing SM' is an interval [−1/Fchip,1/Fchip] around the peak, e.g., punctual replica P, i.e., [−1 chip, +1 chip], or 2 chips wide, so that the power is zero outside. As shown in FIG. 11, this is the separation distance SD between the spoof peak $ss_i$ and the genuine peak $ss_i$ when are completely separated.

The solutions disclosed herein have thus significant advantages with respect to the known solutions.

Advantageously the solution here described does not require extra hardware to operate because the auxiliary channels are obtained by rearranging via software spare hardware tracking channels.

The adoption of an integrated hardware/software strategy that uses in a smart way redundant channels of the GNSS solution without raising the complexity of the system and the cost of the overall BOM (e.g., antenna diversity case).

Of course, without prejudice to the principle of the invention, the details of construction and the embodiments may vary widely with respect to what has been described and illustrated herein purely by way of example, without thereby departing from the scope of the present invention, as defined by the ensuing claims.

The receiver apparatus may send the detection alert to a host processor of an autonomous driving system or of another navigation system exploiting such GNSS receiver apparatus.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for detecting spoofing in a Global Navigation Satellite System (GNSS) receiver, the method comprising:
    receiving a satellite signal;
    acquiring the satellite signal as a received signal;
    tracking the received signal, the tracking including:
        receiving the received signal in a tracking channel, the tracking channel comprising a bank of correlators receiving in-phase and quadrature versions of the received signal,
        generating, by a GNSS pseudo random noise sequence generator, a pseudo random noise sequence at a code frequency set by a code numerical controlled oscillator in the tracking channel determining a code rate;
        performing GNSS pseudo random noise delayed sequence generation, the performing including generating, based on the pseudo random noise sequence, a set of replicas of the pseudo random noise sequence comprising a punctual replica and a plurality of replicas that are early in time or delayed in time with respect to a time spacing threshold; and
        correlating the received signal with each replica in the set of replicas of the pseudo random noise sequence to obtain amplitude correlation values;
    monitoring the tracking channel, the monitoring used to detect a spoofed signal, the monitoring comprising generating a further plurality of replicas of the pseudo random noise sequence of a tracking channel having a respective time spacing greater than the time spacing threshold;
    correlating the received signal of the tracking channel with each replica in the further plurality of replicas of the pseudo random noise sequence to obtain further amplitude correlation values;
    calculating a shape anomaly factor as a function of the further amplitude correlation values determined by the further plurality of replicas;
    verifying that the shape anomaly factor is greater than a shape anomaly threshold; and
    signaling detection of the spoofed signal on the monitored tracking channel.

2. The method according to claim 1, wherein the monitoring comprises providing a set of tracking channels having a first subset of tracking channels and a second subset of tracking channels, the first subset of tracking channels operating with replicas spaced at the time spacing threshold, the second subset of auxiliary channels operating with replicas spaced at a second time spacing, the second time spacing being greater than the time spacing threshold; and
    wherein the monitoring comprises allocating a corresponding monitoring channel comprising a auxiliary tracking channel in the second subset of auxiliary channels having respective replicas spaced at the second time spacing, the auxiliary tracking channel receiving the same signal received by the monitored tracking channel and operating with the same pseudo random noise sequence.

3. The method according to claim 2, wherein the monitoring comprises:
    measuring a parameter that is a representative of input noise on a representative tracking channel;
    determining that the parameter is greater than a noise threshold; and
    allocating the representative tracking channel as the corresponding monitoring channel.

4. The method according to claim 3, wherein the parameter is a weighted sum of early minus late (EML) and double delta (DD) discriminator parameters.

5. The method according to claim 3, wherein the determining comprises verifying that the measured parameter is greater than corresponding parameters representative of the input noise measured on other tracking channels in the first subset of tracking channels.

6. The method according to claim 2, further comprising calculating a shape anomaly factor as a function of amplitude correlation values of the auxiliary tracking channels, the calculating comprising computing a sum of differences between points having nominally the same amplitude correlation values in each auxiliary channel with respect to a nominal tracked peak point.

7. The method according to claim 1, wherein the monitoring the tracking channel to detect the spoofed signal includes providing a set of tracking channels comprising a first subset of tracking channels operating with replicas spaced using a first delay value, and a second subset of auxiliary channels with replicas spaced using a second delay value greater than the first delay value; and
    wherein the monitoring comprises allocating a corresponding monitoring channel comprising a plurality of auxiliary tracking channels in the second subset of auxiliary channels, having respective replicas that are delay shifted one with respect to the other of a third delay.

8. The method according to claim 1, wherein signaling detection of the spoofed signal on the monitored tracking channel includes signaling a spoofing alert.

9. The method according to claim 1, wherein the signaling detection comprises gating an output of the monitored tracking channel.

10. The method according to claim 1, wherein the signaling detection comprises:
   detecting a separation between the spoofed signal and the satellite signal being greater than a separation threshold, the separation being detected as a function of a number of chips between the spoof signal and the satellite signal; and
   stopping the tracking channel in response to the separation being greater than the separation distance threshold, then reacquiring the satellite signal.

11. The method according to claim 10, further comprising:
   performing a runtime consistency check between a satellite predicted position and a range peak point measurement, the satellite predicted position obtained by Ephemerides extrapolation, and the range peak point measurement being an output of the monitored tracking channel;
   determining that a spatial separation between the spoofed signal and the satellite signal is greater than a separation distance threshold;
   discarding a current monitored tracking channel based on the determining that the spatial separation is greater than the separation distance threshold; and
   reacquiring the satellite signal using the satellite predicted position.

12. A receiver apparatus configured to detect a spoofed signal, the receiver apparatus comprising:
   an arrangement comprising a signal receiver, a code numerical controlled oscillator, and a Global Navigation Satellite System (GNSS) pseudo random noise sequence generator, wherein the arrangement is configured to:
      receive a satellite signal;
      acquire the satellite signal as a received signal;
      track the received signal, including:
         receive the received signal in a tracking channel, the tracking channel comprising a bank of correlators receiving in-phase and quadrature versions of the received signal,
         generate, by the GNSS pseudo random noise sequence generator, a pseudo random noise sequence at a code frequency set by the code numerical controlled oscillator in the tracking channel determining a code rate;
         perform GNSS pseudo random noise delayed sequence generation, the performing including generating, based on the pseudo random noise sequence, a set of replicas of the pseudo random noise sequence comprising a punctual replica and a plurality of replicas that are early in time or delayed in time with respect to a time spacing threshold; and
         correlate the received signal with each replica in the set of replicas of the pseudo random noise sequence to obtain amplitude correlation values;
   wherein the GNSS pseudo random noise sequence generator is configured to generate a further plurality of replicas of the pseudo random noise sequence of the tracking channel having a respective time spacing greater than the given time spacing threshold; and
   wherein the arrangement is further configured to:
      correlate the received signal of the tracking channel with each replica in the further plurality of replicas of the pseudo random noise sequence to obtain further amplitude correlation values;
      calculate a shape anomaly factor as a function of the further amplitude correlation values determined by the further plurality of replicas;
      determine whether the shape anomaly factor is greater than a shape anomaly threshold; and
      in response to the shape anomaly factor being greater than the shape anomaly threshold, signal detection of the spoofed signal on the tracking channel.

13. The receiver apparatus according to claim 12, further comprising a set of tracking channels comprising:
   a first subset of tracking channels configured to operate with a set of replicas spaced at the time spacing threshold; and
   a second subset of auxiliary channels configured to operate with replicas spaced at a second time spacing, the second time spacing have a spacing greater than the time spacing threshold.

14. The receiver apparatus according to claim 12, further comprising a set of tracking channels comprising:
   a first subset of tracking channels operating with a set of replicas spaced with a first delay value; and
   a second subset of auxiliary channels spaced with a second delay value greater than the first delay value.

15. The receiver apparatus according to claim 12, wherein the GNSS pseudo random noise sequence generator is configured to:
   generate the set of replicas of the pseudo random noise sequence having the time spacing threshold, and
   generate the further plurality of replicas having the respective time spacing greater than the time spacing threshold.

16. A non-transitory computer-readable media storing computer instructions, that when executed by a processor cause the processor to perform the steps of:
   receiving a satellite signal;
   acquiring the satellite signal as a received signal;
   tracking the received signal, including:
      receiving the received signal in a tracking channel, the tracking channel comprising a bank of correlators receiving in-phase and quadrature versions of the received signal,
      generating a pseudo random noise sequence at a code frequency determining a code rate;
      performing Global Navigation Satellite System (GNSS) pseudo random noise delayed sequence generation, including generating, based on the pseudo random noise sequence, a set of replicas of the pseudo random noise sequence comprising a punctual replica and a plurality of replicas that are early in time or delayed in time with respect to a time spacing threshold; and
      correlating the received signal with each replica in the set of replicas of the pseudo random noise sequence to obtain amplitude correlation values;
   monitoring the tracking channel to detect a spoofed signal by generating a further plurality of replicas of the pseudo random noise sequence of a tracking channel having a respective time spacing greater than the time spacing threshold;
   correlating the received signal of the tracking channel with each replica in the further plurality of replicas of the pseudo random noise sequence to obtain further amplitude correlation values;

calculating a shape anomaly factor as a function of the further amplitude correlation values determined by the further plurality of replicas;

verifying the shape anomaly factor is greater than a shape anomaly threshold; and signaling detection of the spoofed signal on the monitored tracking channel.

17. The non-transitory computer-readable media of claim 16, wherein the monitoring comprises providing a set of tracking channels having a first subset of tracking channels and a second subset of tracking channels, the first subset of tracking channels operating with replicas spaced at the time spacing threshold, the second subset of auxiliary channels operating with replicas spaced at a second time spacing, the second time spacing being greater than the time spacing threshold; and wherein the monitoring comprises allocating a corresponding monitoring channel comprising a tracking channel in the second subset of auxiliary channels having respective replicas spaced at the second time spacing, the auxiliary tracking channel receiving the same signal received by the monitored tracking channel and operating with the same pseudo random noise sequence.

18. The non-transitory computer-readable media of claim 17, wherein the monitoring the tracking channel to detect the spoofed signal includes providing a set of tracking channels comprising a first subset of tracking channels operating with replicas spaced using a first delay value, and a second subset of auxiliary channels with replicas spaced using a second delay value greater than the first delay value; and wherein the monitoring comprises allocating a corresponding monitoring channel comprising a plurality of auxiliary tracking channels in the second subset of auxiliary channels, having respective replicas that are delay shifted one with respect to the other of a third delay.

19. The non-transitory computer-readable media of claim 17, wherein the monitoring comprises:

measuring a parameter that is a representative of input noise on a representative tracking channel;

determining that the parameter is greater than a noise threshold; and allocating the representative tracking channel as the corresponding monitoring channel.

20. The non-transitory computer-readable media of claim 17, further comprising software code portions for performing:

calculating a shape anomaly factor as a function of amplitude correlation values of the auxiliary tracking channels, the calculating including computing a sum of differences between points having nominally the same amplitude correlation values in each auxiliary channel with respect to a nominal tracked peak point.

* * * * *

UNITED STATES PATENT AND TRADEMARK OFFICE
CERTIFICATE OF CORRECTION

| | |
|---|---|
| PATENT NO. | : 11,640,003 B2 |
| APPLICATION NO. | : 17/313434 |
| DATED | : May 2, 2023 |
| INVENTOR(S) | : Domenico Di Grazia et al. |

It is certified that error appears in the above-identified patent and that said Letters Patent is hereby corrected as shown below:

In the Claims

Claim 12, Column 19, Line 67; delete "given".

Signed and Sealed this
Thirtieth Day of May, 2023

Katherine Kelly Vidal
*Director of the United States Patent and Trademark Office*